United States Patent
Makkonen et al.

(10) Patent No.: US 9,868,164 B2
(45) Date of Patent: Jan. 16, 2018

(54) APPARATUS FOR MACHINING, PARTICULARLY FOR CUTTING A TUBULAR OR ROUND SECTION BODY

(75) Inventors: Seppo Makkonen, Helsinki (FI); Mika Priha, Helsinki (FI)

(73) Assignee: EXACT TOOLS OY, Helsinki (FI)

( * ) Notice: Subject to any disclaimer, the term of this patent is extended or adjusted under 35 U.S.C. 154(b) by 745 days.

(21) Appl. No.: 13/877,879

(22) PCT Filed: Oct. 5, 2011

(86) PCT No.: PCT/FI2011/050860
§ 371 (c)(1),
(2), (4) Date: Jul. 1, 2013

(87) PCT Pub. No.: WO2012/045912
PCT Pub. Date: Apr. 12, 2012

(65) Prior Publication Data
US 2013/0269500 A1    Oct. 17, 2013

(30) Foreign Application Priority Data
Oct. 5, 2010   (FI) ...................................... 20106025

(51) Int. Cl.
B23D 45/12    (2006.01)
B23C 1/20     (2006.01)
(Continued)

(52) U.S. Cl.
CPC ............... *B23D 21/04* (2013.01); *B23C 1/20* (2013.01); *B23C 3/34* (2013.01); *B23D 45/126* (2013.01);
(Continued)

(58) Field of Classification Search
CPC ........................ B23D 45/126; Y10T 29/5199
(Continued)

(56) References Cited

U.S. PATENT DOCUMENTS 4,625,464 A * 12/1986 Kubo .................. B23D 45/006
30/92
4,830,551 A    5/1989 Brennan et al.
(Continued)

FOREIGN PATENT DOCUMENTS

DE          3251697       6/1985
FI        108927 B1       4/2002
(Continued)

OTHER PUBLICATIONS

Machine translation of JP 2006-102897-A, which JP '897 was published Apr. 20, 2006.*

(Continued)

*Primary Examiner* — Erica E Cadugan
(74) *Attorney, Agent, or Firm* — Berggren Inc.

(57) ABSTRACT

An apparatus (100) for machining a tubular or round-bar type piece, wherein the apparatus comprises a frame element (102), a machining unit (104), as well as a threaded shaft (110), which is fitted to the frame element in a rotatable and axially immobile fashion and has a first section 110a provided with a right-handed thread and a second section (110b) with a left-handed thread. The first section is provided with at least one first support element (106a) and the second section is provided with at least one second support element (106b), the mutual distance between the support elements being adjustable in response to rotating the threaded shaft, such that the support elements, for example wheels, are adapted to touch a workpiece and to support and guide the apparatus (100) in the process of machining the piece. At least one of the support elements, such as wheels (106a, 106b), is adapted to be capable of rotating relative to its axis in response to moving the apparatus along the surface of a workpiece.

16 Claims, 2 Drawing Sheets

(51) Int. Cl.
*B23C 3/34* (2006.01)
*B23C 3/12* (2006.01)
*B23Q 9/00* (2006.01)
*B23D 21/04* (2006.01)
*B27B 9/02* (2006.01)

(52) U.S. Cl.
CPC ......... *B23Q 9/0021* (2013.01); *B23Q 9/0028* (2013.01); *B23Q 9/0035* (2013.01); *B27B 9/02* (2013.01); *B23C 3/122* (2013.01); *B23C 3/126* (2013.01); *Y10T 29/5199* (2015.01); *Y10T 83/0333* (2015.04); *Y10T 83/667* (2015.04); *Y10T 83/68* (2015.04); *Y10T 409/30644* (2015.01); *Y10T 409/304144* (2015.01)

(58) Field of Classification Search
USPC .......................................................... 29/33 T
See application file for complete search history.

(56) References Cited

U.S. PATENT DOCUMENTS

| | | | |
|---|---|---|---|
| 5,081,768 A | | 1/1992 | Brennan et al. |
| 5,349,751 A | | 9/1994 | Fahr |
| 7,257,895 B2 | * | 8/2007 | Makkonen ........... B23D 45/126 |
| | | | 269/242 |
| 2003/0093904 A1 | * | 5/2003 | Makkonen ........... B23D 45/126 |
| | | | 30/96 |
| 2010/0024613 A1 | * | 2/2010 | Choi ....................... B23C 3/122 |
| | | | 82/47 |
| 2010/0186564 A1 | | 7/2010 | Pierce |
| 2010/0223970 A1 | * | 9/2010 | Dole ......................... B23B 5/08 |
| | | | 72/110 |
| 2015/0202699 A1 | * | 7/2015 | Makkonen ........... B23D 45/126 |
| | | | 30/102 |

FOREIGN PATENT DOCUMENTS

| | | | |
|---|---|---|---|
| FI | 118076 B1 | | 6/2007 |
| JP | 37008040 B | | 7/1937 |
| JP | 39034751 Y | | 11/1964 |
| JP | 60149717 U | | 8/1985 |
| JP | 61081817 U | | 5/1986 |
| JP | 2002178214 | | 12/2000 |
| JP | 2002205218 A | | 7/2002 |
| JP | 2006102897 A | | 4/2006 |
| JP | 2006528916 A | | 12/2006 |
| WO | 0202271 A1 | | 10/2002 |
| WO | 2004103623 A1 | | 12/2004 |
| WO | 2007104105 A1 | | 9/2007 |
| WO | WO 2007/111422 A1 * | | 10/2007 |
| WO | 2009148786 A1 | | 10/2009 |

OTHER PUBLICATIONS

International Search Report, PCT/FI2011/050860, dated Feb. 26, 2012.

* cited by examiner

APPARATUS FOR MACHINING, PARTICULARLY FOR CUTTING A TUBULAR OR ROUND SECTION BODY

This application claims priority of PCT Application No. PCT/FI2011/050860, filed on Oct. 5, 2011, which claims priority of Finnish Application No. 20106025, filed on Oct. 5, 2010, the entire disclosures of which are incorporated herein by reference.

FIELD

The invention relates to an apparatus for machining, particularly for cutting, but also for scoring and/or beveling a tubular or round-bar type piece.

BACKGROUND

A variety of tools are known from the prior art for machining, such as for cutting or milling a tubular or round-bar type piece, or beveling the same at its end. One exemplary tool of the prior art is the angle grinder, comprising a rotating disc for cutting a piece. The rotating disc can also be used for beveling the end of a piece.

However, a problem with such tools is for example how to produce a straight cutting result across the entire pipe, i.e. such that, as the cutting tool is advanced along the pipe surface, how to coincide the finishing point exactly with the starting point without the operator having to make any corrective actions for example towards the very end, thus producing a bend in the cutting line. Another problem with prior known devices is the absence of support, making both cutting and beveling particularly inconvenient. Often, the cutting point or beveling result is not smooth, thus resulting in a possible leakage point for example in the pipe system, either by its raggedness or with sharp cutting edges damaging pipe seals in the process of installing a pipe.

The prior art also discloses devices, seeking to eliminate some of the above-mentioned problems. For example, the Applicant's own patent publication FI 118076 B describes an apparatus, wherein the apparatus includes a clamping mechanism adapted to be fastened to said workpiece rotatably therearound. The clamping mechanism particularly includes a frame element and first and second arms extending therefrom, said arms being articulated at one end to the frame element of the clamping mechanism and each arm having its free end fitted with a bearing axle which is provided with at least one bearing wheel for contact with the surface of a workpiece. The clamping mechanism can be tightened around a piece of circular cross-section by means of said devices. Said apparatus has worked excellently with small and even medium-size pipe dimensions and especially with major resultant cutting forces, whereby the clamping mechanism has retained the machining unit stationary in lateral direction, thus enabling for example the production of a straight cutting result. A problem is nevertheless encountered with large pipe dimensions, because in the process of machining a piece of large dimensions, the arms extending around the piece must have their articulations, by which the arms attach to the clamping mechanism's frame element, spaced from each other at least by a distance that matches the diameter of the piece. What this entails is that, when machining for example a piece 1000 mm in diameter, the clamping mechanism's frame must have a length somewhat in excess of 1000 mm, whereby the apparatus becomes quite bulky and heavy, and hence awkward to operate, as well as often also hazardous as the apparatus is no longer good for steady manual handling. Indeed, it has been an alternative in the prior art to employ equipment of various sizes for pieces of various diameters, which is of course expensive as it requires at least two or three pieces of equipment in varying sizes.

Also, on the other hand, when machining thin-walled pieces, such as for example a thin-walled spiral welded pipe, the clamping mechanisms fastening around a piece may compress the piece and thereby change its shape, whereby producing a straight cutting result becomes difficult or even impossible.

Furthermore, in prior art equipment, the adjustment of a machining or cutting depth to optimal is a difficult operation.

SUMMARY

One objective of the invention is to eliminate or at least mitigate the drawbacks related to the prior art. According to one embodiment, the invention seeks to provide such an apparatus for machining a tubular or round-bar type piece, wherein one and the same apparatus could enable machining, especially cutting and/or beveling, tubular and round-bar type pieces of all diameter sizes. Another objective is that the apparatus would enable a groove to be readily machined on the surface of a piece, for example for an O-ring seal or for example for external gripping elements. A still further objective is to provide a compact size and readily manageable hand tool. A still additional objective is to provide a structurally simple and functional apparatus, which enables machining for example spiral welded pipes, other thin-walled metal pipes, as well as plastic tubes, yet without being limited merely to those.

Some objectives of the invention are achieved with an apparatus as described herein.

The apparatus of the invention is characterized by an apparatus (100) for machining, especially for cutting, scoring and/or beveling a tubular or round-bar type piece (108), where the apparatus comprises a frame element (102) as well as devices for attaching a machining unit to the frame element, and wherein the apparatus is further provided with adjustment elements for moving a tool member of said machining unit relative to the frame element (102) towards or away from the workpiece (108), wherein the frame element (102) is provided, in a rotatable and axially immobile fashion, with a threaded shaft (110) whose first section (110a) has a right-handed thread and whose second section (110b) has a left-handed thread, and wherein said first section (110a) is provided with at least one first support element (106a) and said second section (110b) is provided with at least one second support element (106b), whereby a mutual distance (107) between the support elements is adjustable preferably at the same time as the threaded shaft (110) is rotated, such that said support elements (106a, 106b) are adapted to touch said piece (108) and to support and guide the apparatus as the piece is being machined, and wherein at least one of the support elements (106a, 106b) is adapted to be capable of rotating relative to its axis in response to the apparatus being moved along the surface of a workpiece.

In the invention, according to a first embodiment, the apparatus for machining, such as for example cutting, a tubular or round-bar type piece, or beveling the end of a piece, comprises a frame element, as well as devices for attaching a machining unit to the frame element. The machining unit can be attached to the frame element of the apparatus for example with attachment devices known as such for example from the prior art, for example with bolts or slide tracks, and preferably in such a way that the machining unit's position can be adjusted in relation to the frame element's longitudinal axis for producing a straight cutting result. The apparatus is further provided with adjustment elements, for example a hinge, a slide track or the like corresponding adjustment element, for moving said machining unit's tool member relative to the frame towards or away from a workpiece. Hence, for example in the process of cutting a piece, the machining unit, or at least the tool member rotated thereby, such as a cutting saw, disc and/or a beveling disc, is moved towards the workpiece.

According to the invention, the frame element is provided in a rotatable and axially immobile fashion with a threaded shaft having a right-handed thread in its first section and a left-handed thread in its second section. In addition, said first section is provided with at least one first support element and said second section is provided with at least one second support element, the mutual distance between the support elements being adjustable in response to rotating the threaded shaft through the action of an adjustment device associated therewith. It should be noted that the support elements related to the first and second sections of the threaded shaft are preferably adapted to travel simultaneously in response to rotating the threaded shaft. The mutual distance between the support elements is preferably adjusted as required by the diameter of a round-bar type workpiece, such that the apparatus is able to rotate along an outer surface or periphery of the piece co-directionally with the cutting line as the piece is being machined, yet preferably such that the frame element of the apparatus does not touch the workpiece and that the apparatus does not slip in a direction lateral to the cutting result.

In addition, the mutual distance between the support elements is used for adjusting the distance of a tool member, enabling an adjustment of the distance in such a way that, at its lowest point, the tool member makes an exactly optimal contact with an object to be machined, for example cuts a piece in case said piece is intended for cutting, or alternatively just mills the surface for an appropriately deep, not penetrating groove, for example for O-seal ring. The adjustment of a cutting depth also makes it possible to use small-diameter tools in the machining unit. One of the benefits of small-diameter tools is being not easily deformed for example in response to resultant cutting forces.

According to one preferred embodiment of the invention, the support elements are adapted, during a machining operation, to touch a workpiece and to support and guide the apparatus directly while the piece is being worked on. At least one of the support elements is designed to be rotatable relative to its axis while moving the apparatus along the surface of a workpiece. Most preferably, this type of support element is a wheel. According to one embodiment, the wheel can be provided with a ratchet mechanism, whereby the wheel is most preferably adapted to rotate in a working direction but to become clamped in the other direction, the mechanism thus guiding operator of the apparatus to work the tool member in a correct direction for providing an optimal cutting result or beveling result.

According to one embodiment, the support element adapted to be rotatable relative to its axis comprises at least one wheel, or a set of wheels, or a roll elongated with respect to its axis of rotation, most preferably a flexible roll, for example a rubbery roll. Furthermore, according to one embodiment, both the first support element associated with said first section and the second support element associated with said second section comprise at least one wheel, or a set of wheels, or a roll elongated with respect to its axis of rotation. According to still another preferred embodiment, at least one section of the threaded shaft is provided with two spaced-apart wheels adapted to rotate relative to their axes.

According to one embodiment of the invention, the first support element associated with said first section comprises at least one wheel and the second support element associated with said second section comprises at least one wheel. According to one embodiment, between said wheels is provided a roll or a band, most preferably a flexible roll or band, such as a rubber roll or band, which is adapted to contact the surface of a workpiece substantially across the entire distance between said wheels.

According to one embodiment, at least one of the support elements is a ski or a slide or some other support element made capable of sliding along the surface of a workpiece.

The support element is most preferably in such a configuration that, when in touch with a workpiece, the support element's friction is higher in lateral direction than in longitudinal direction, i.e. for example in the direction of a pipe cutting line. This is accomplished for example with a wheel, most preferably with a rubber wheel.

According to one embodiment of the invention, the apparatus further comprises also adjustment elements for adjusting the angle of at least one support element with respect to the longitudinal axis of a machining unit associated with said frame element. Hence, the angle of a machining unit, or at least that of a tool member associated therewith, with respect to the longitudinal axis of the apparatus' frame element can be adjusted for example for achieving a straight cutting result.

Most preferably, the machining unit is adapted to be attached to the apparatus' frame element in such a way that, during a machining operation, the machining unit's tool member is in contact with a workpiece outside said frame element's bearing surface, whereby there is no need to provide the apparatus' frame element with a separate opening for the tool member, which opening would provide an access for the tool member to machine a workpiece.

The machining unit may have its tool member in the form of a saw, a cutting disc or blade, or an implement intended for beveling the end of piece, or a combination of the above, particularly a combination of the cutting saw and the beveling-intended implement, whereby the cutting and beveling can be performed concurrently. It should be noted that by adjusting, according to the invention, the distance between the support elements as appropriate, the cutting depth will become optimal and consistent over the entire periphery of a piece.

The invention provides obvious benefits over the prior art. First of all, the resulting apparatus is small and, moreover, one and the same apparatus can be used for machining, among others, pipes both small and very large in diameter. A straight cutting result is easily obtained, even with large-diameter pieces and, in addition, factors resulting from wearing of the blade, material of the workpiece, or operator of the apparatus, among others, can be readily offset for example by adjusting the angle between the machining unit and the longitudinal axis of the apparatus' frame element. In addition, the machining of a spiral welded pipe can also be managed directly, especially with such an apparatus of the invention wherein the support element is constituted by a wheel, and most preferably with such an apparatus wherein three or four wheels make up the support element, whereby at least one wheel is present on a flat while another is crossing the joint of a spiral welded pipe. The pipe to be machined can also be a plastic tube, which can be both cut and beveled by means of an apparatus of the invention in a single operation by using a suitable tool member.

BRIEF DESCRIPTION OF THE DRAWINGS

Preferred embodiments of the invention will be described slightly more specifically in the next section with reference to the accompanying figures, in which.

DETAILED DESCIPTION

Figure 1:
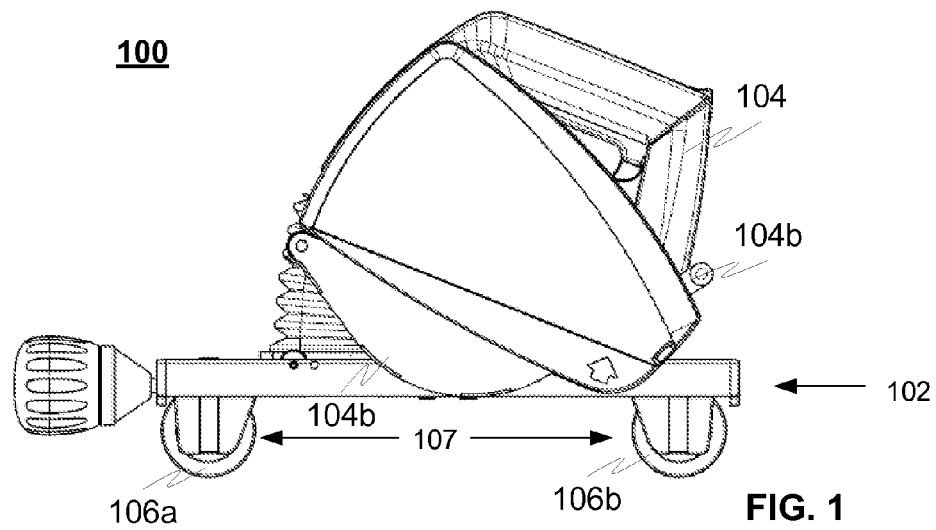
FIG. 1 shows one exemplary apparatus of the invention for machining in accordance with one preferred embodiment of the invention.
Figure 2:
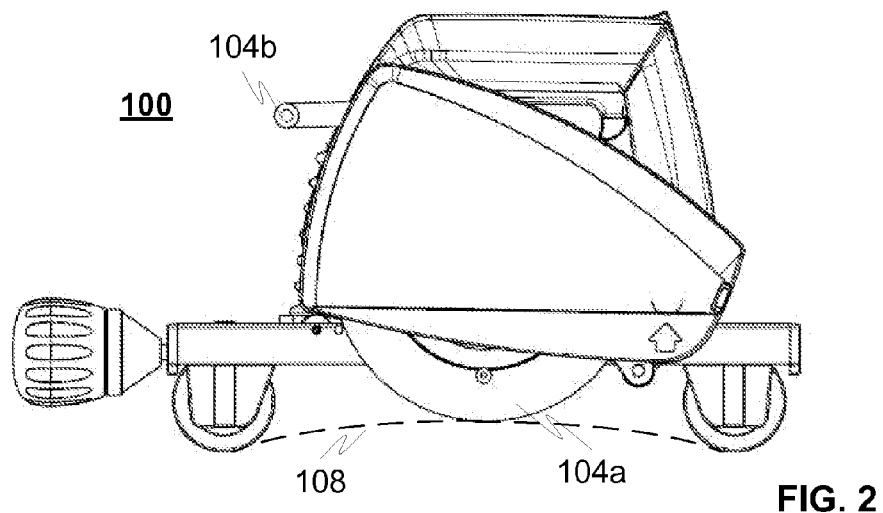
FIG. 2 shows one exemplary apparatus of the invention in a working condition in accordance with one preferred embodiment of the invention.
Figure 5:
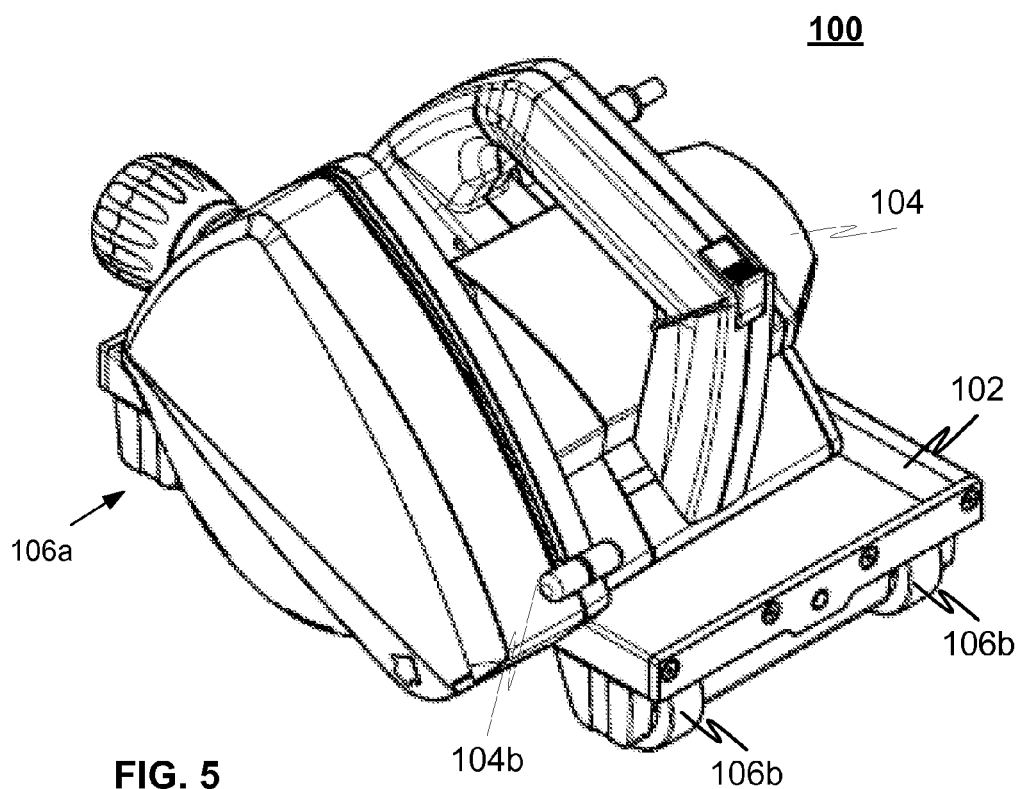
FIG. 5 shows one exemplary apparatus of the invention in a working condition in a view obliquely from above in accordance with one preferred embodiment of the invention.

FIGS. 1 and 5 illustrate one exemplary apparatus 100 in a transport condition, wherein a tool member 104a is covered by a pivotable guard 104b, and FIG. 2 illustrates the apparatus 100 in a working condition, wherein the pivotable guard 104b has turned, such that at least a part of the tool member 104a is exposed outside the guard 104. The apparatus 100 comprises a frame element 102, as well as a machining unit 104 for rotating the tool member 104a. In addition, the exemplary apparatus comprises at least one first support element 106a and at least one second support element 106b for bearing the apparatus 100 on a workpiece 108 while working on it. The apparatus is further provided with adjustment elements, for example a hinge or a slide track, for moving the tool member 104a relative to the frame element 102 towards or away from the workpiece 108. Thus, for example in the process of cutting and/or beveling the piece 108, the tool member 104a is moved towards the workpiece 108, as shown in FIG. 2. The tool member 104a has a trajectory which can naturally be adjusted and/or limited with prior known equipment.

Figure 3:
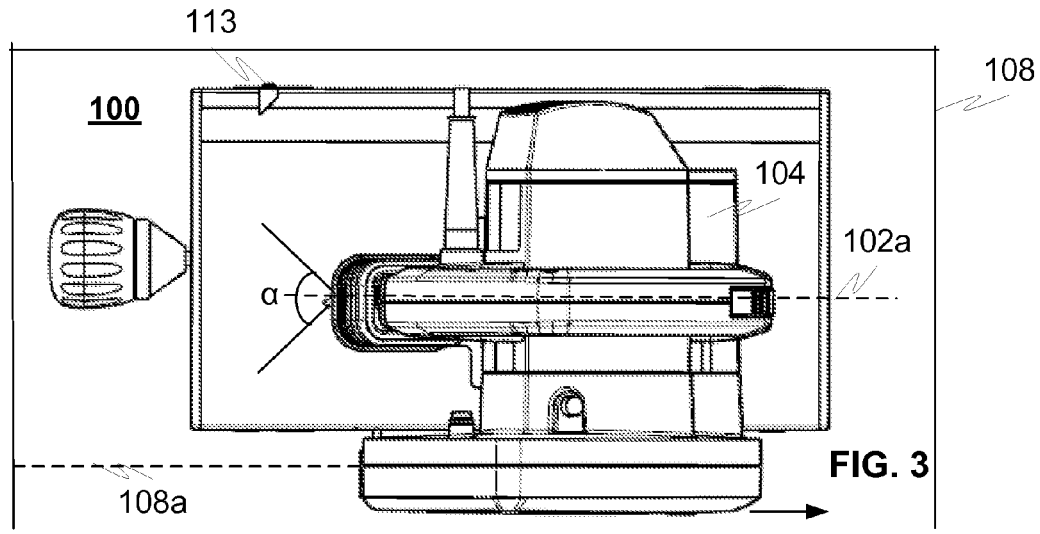
FIG. 3 shows one exemplary apparatus of the invention in a view from above in accordance with one preferred embodiment of the invention.

A lateral position (α) of the machining unit 104 can be adjusted with respect and in relation to a longitudinal axis 102a of the apparatus' 100 frame element 102 for example for producing a straight cutting result 108a as the apparatus is moved along a periphery of the tubular piece 108, as can be seen in FIG. 3. The apparatus may include a scale (α) for displaying a magnitude of the lateral angle. The apparatus may also include indication elements 113, for example an indicator and scale, for revealing a distance between and a diameter of the support elements, for which diameter said adjustment is optimal for example in the sense of cutting or scoring. In addition, as appears particularly from FIG. 3, the machining unit 104 is adapted to be attached to the apparatus' frame element 102 in such a way that, during a working operation, the machining unit's tool member 104a touches the workpiece 108 outside said frame element's bearing surface, whereby a separate opening need not be provided for the tool member in the apparatus' frame element 102.

Figure 4:
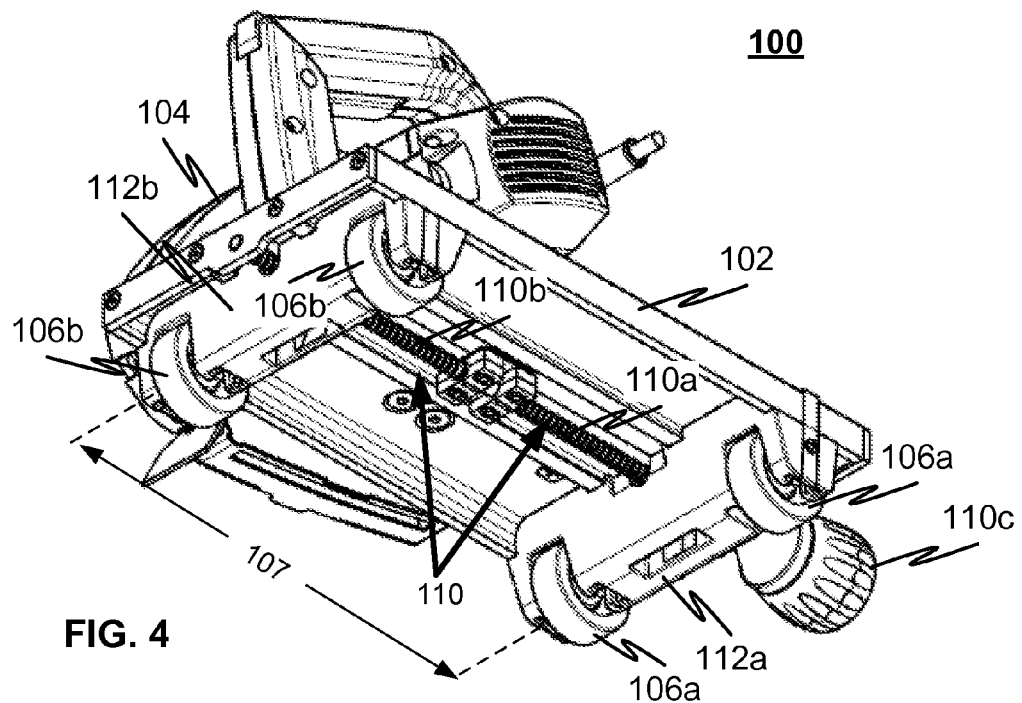
FIG. 4 shows one exemplary apparatus of the invention in a view obliquely from below in accordance with one preferred embodiment of the invention.

FIG. 4 illustrates one exemplary apparatus 100 and its frame element 102 in a view obliquely from below, wherein the frame element 102 is provided, in a rotatable and axially immobile fashion, with a threaded shaft 110 whose first section 110a has a right-handed thread and whose second section 110b has a left-handed thread. According to one preferred embodiment of the invention, the first section 110a carries two wheel-shaped support elements 106a and the second section carries two wheel-shaped support elements 106b. The support elements 106a, 106b can be fitted in connection with the threaded shaft sections 110a, 110b through the intermediary of appropriate attachment elements 112a, 112b, such as for example through the intermediary of cradle type attachment elements shown in FIG. 4, wherein the cradle type attachment elements are preferably provided with threaded parts matching the threads of the threaded shaft. Consequently, a mutual distance 107 between the support elements 106a, 106b is adjustable, in response to rotating the threaded shaft 110, through the intermediary of an adjustment element 110c connected thereto. According to one particularly preferred embodiment of the invention, the frame element 102 of the apparatus 100 comprises two separate attachment elements 112a, 112b, which are fitted to the threaded shaft sections 110a, 110b, and each of which comprises two separate wheels 106a, 106b (support elements), the angle of said wheels having been preferably adjusted or being adjustable in such a way that the frame element 102 and thereby also the machining unit and tool member 104a are moving in a straight line. This enables, for example, a finishing point of the cutting line to be coincided with a starting point as the apparatus is moved along the periphery of a tubular or round-bar type workpiece. According to this embodiment, the distance between the cradle type attachment elements 112a, 112b, and thereby also the distance 107 between the wheels 106a, 106b, is adjustable in response to rotating the threaded shaft 110.

Described above are just a few embodiments for a solution of the invention. The principle according to the invention can naturally be modified within the scope of protection defined by the claims, regarding for example the details and fields of use for a particular embodiment. Especially the number of support elements, such as wheels, can be higher or lower than the illustrated 4, although, as a number, 4 is particularly advantageous for establishing a straight working line around the entire peripheral extent of a workpiece.

The invention claimed is:

1. An apparatus for machining, comprising:
   a frame element having a longitudinal axis and an outer perimeter;
   a machining unit;
   a device for attaching the machining unit to the frame element;
   an adjustment element enabling movement of a tool member of the machining unit relative to the frame element towards and away from a workpiece;
   wherein the frame element is provided with a threaded shaft having a longitudinal axis, the shaft being rotatable about its longitudinal axis and axially immobile relative to the frame element in a direction of the longitudinal axis of the threaded shaft, and wherein the threaded shaft has a first section with a right-handed thread and a second section having a left-handed thread; and
   wherein the first section carries a first support element connected with the threaded shaft through a first attachment element, and the second section carries a second support element connected with the threaded shaft through a second attachment element, wherein as the threaded shaft is rotated, the distance between the first and second support elements is adjustable only along the longitudinal axis of the frame element via simultaneous movement of the first and second support elements so that distance of the first and the second support element from the frame element remains constant, wherein the first and second support elements are located within the perimeter of the frame element, and are adapted to touch the workpiece and support the machining apparatus on and above the workpiece and guide the apparatus as the workpiece is being machined;

wherein one of the first or second support elements is adapted to rotate relative to the workpiece so as to roll on the workpiece, wherein a portion of the machining unit is located within the perimeter of the frame element, and wherein the apparatus for machining does not include a clamping mechanism for clamping the apparatus to the workpiece.

2. The apparatus of claim 1, wherein the first or the second support element or both of them comprise a wheel or a set of wheels.

3. The apparatus of claim 2, wherein the first support element comprises a wheel and the second support element comprises a wheel.

4. The apparatus of claim 1, wherein the first or the second support element or both of them comprise a roll.

5. The apparatus of claim 1, wherein the machining unit is configured to cut, score, or bevel a tubular or round bar type workpiece.

6. The apparatus of claim 1, wherein the first or the second support element is configured so that its friction when in contact with the workpiece is higher in a direction that is lateral with respect to the longitudinal axis of the frame element than in a longitudinal direction of the longitudinal axis of the frame element.

7. The apparatus of claim 1, wherein the machining unit is fitted to the frame element so that during operation of the machining unit, the tool member touches the workpiece outside the perimeter of the frame element.

8. The apparatus of claim 1, further comprising an adjustment element for adjusting an angle of the machining unit with respect to the first or second support element and with respect to the longitudinal axis of the frame element.

9. The apparatus of claim 1, wherein the apparatus is a hand tool.

10. The apparatus of claim 1, wherein the tool member comprises a cutting saw, a disc, a tool intended for beveling the end of a machined piece, or a combination thereof.

11. A machining apparatus for cutting, scoring, or beveling tubular or round bar type workpieces with various diameters, comprising:
a frame element having a longitudinal axis and an outer perimeter;
a machining unit;
a device for attaching the machining unit to the frame element;
an adjustment element enabling movement of a tool member of the machining unit relative to the frame element towards and away from a workpiece;
wherein the frame element is provided with a threaded shaft having a longitudinal axis, and the shaft being rotatable about its longitudinal axis and axially immobile relative to the frame element in a direction of the longitudinal axis of the threaded shaft, and wherein the threaded shaft has a first section with a right-handed thread and a second section having a left-handed thread; and
wherein the first section carries a first support element connected with the threaded shaft through a first attachment element, and the second section carries a second support element connected with the threaded shaft through a second attachment element, wherein as the threaded shaft is rotated, the distance between the first and second support elements is adjustable only along the longitudinal axis of the frame element via simultaneous movement of the first and second support elements, so that distance of the first support element and the second support element from the frame element remains constant, and
wherein the first and second support elements are located within the perimeter of the frame element, and are adapted to touch the workpiece and support the machining apparatus on and above the workpiece and guide the apparatus as the workpiece is being machined,
wherein one of the first or second support elements is adapted to rotate relative to the workpiece so as to roll on the workpiece,
wherein a portion of the machining unit is located within the perimeter of the frame element, and
wherein the machining apparatus for machining does not include a clamping mechanism for clamping the machining apparatus to the workpiece.

12. The apparatus of claim 11, wherein the first or the second support element or both of them comprise a wheel or a set of wheels.

13. The apparatus of claim 11, wherein the first or the second support element is configured so that its friction when in contact with the workpiece is higher in a direction that is lateral with respect to the longitudinal axis of the frame element than in a longitudinal direction of the longitudinal axis of the frame element.

14. The apparatus of claim 11, wherein the machining unit is fitted to the frame element so that during operation of the machining unit, the tool member touches the workpiece outside the perimeter of the frame element.

15. The apparatus of claim 11, further comprising an adjustment element for adjusting an angle of machining unit with respect to the first or the second support element and with respect to the longitudinal axis of the frame element.

16. The apparatus of claim 11, wherein the tool member comprises a cutting saw, a disc, a tool intended for beveling the end of a machined piece, or a combination thereof.

* * * * *